UNITED STATES PATENT OFFICE 2,456,599

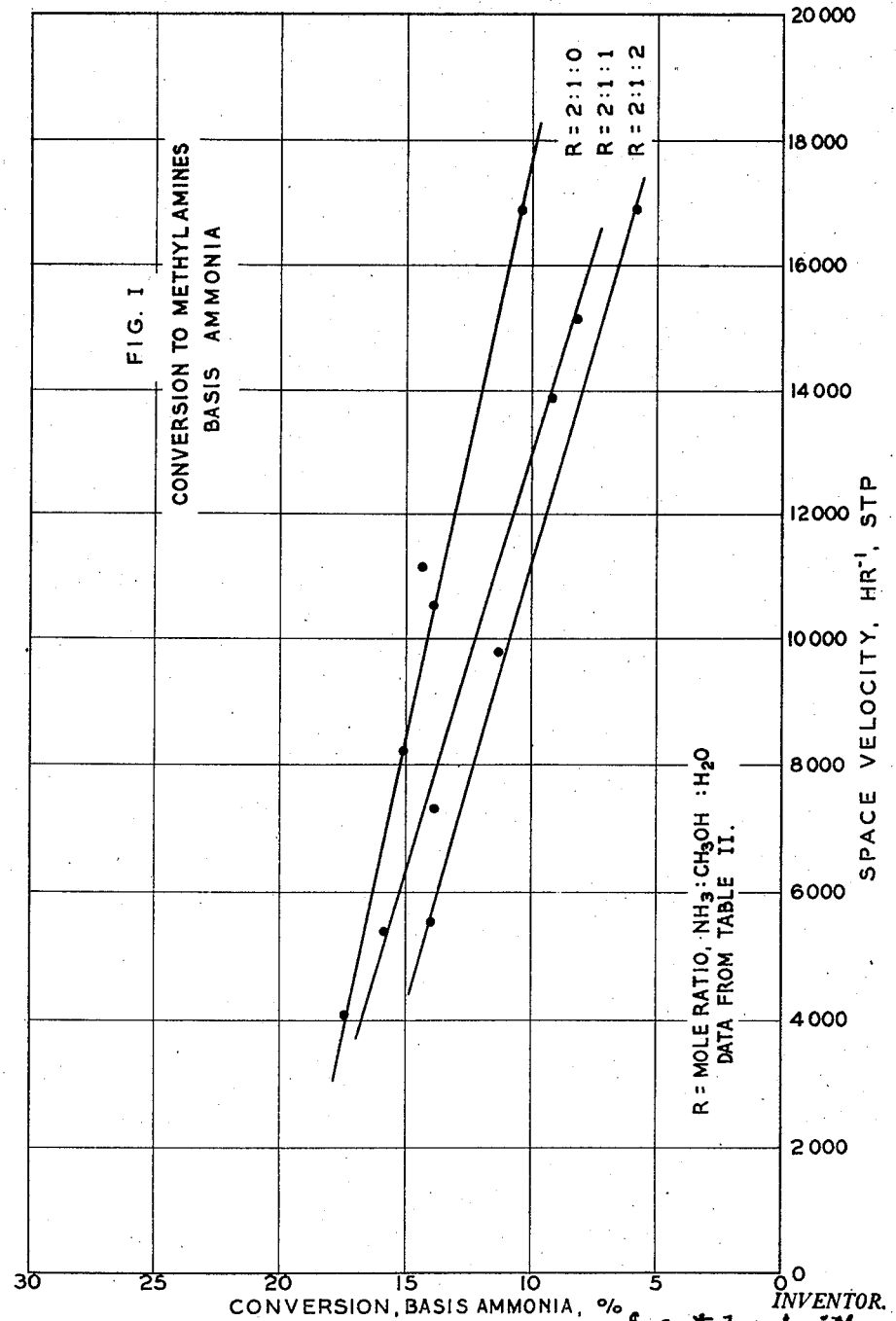

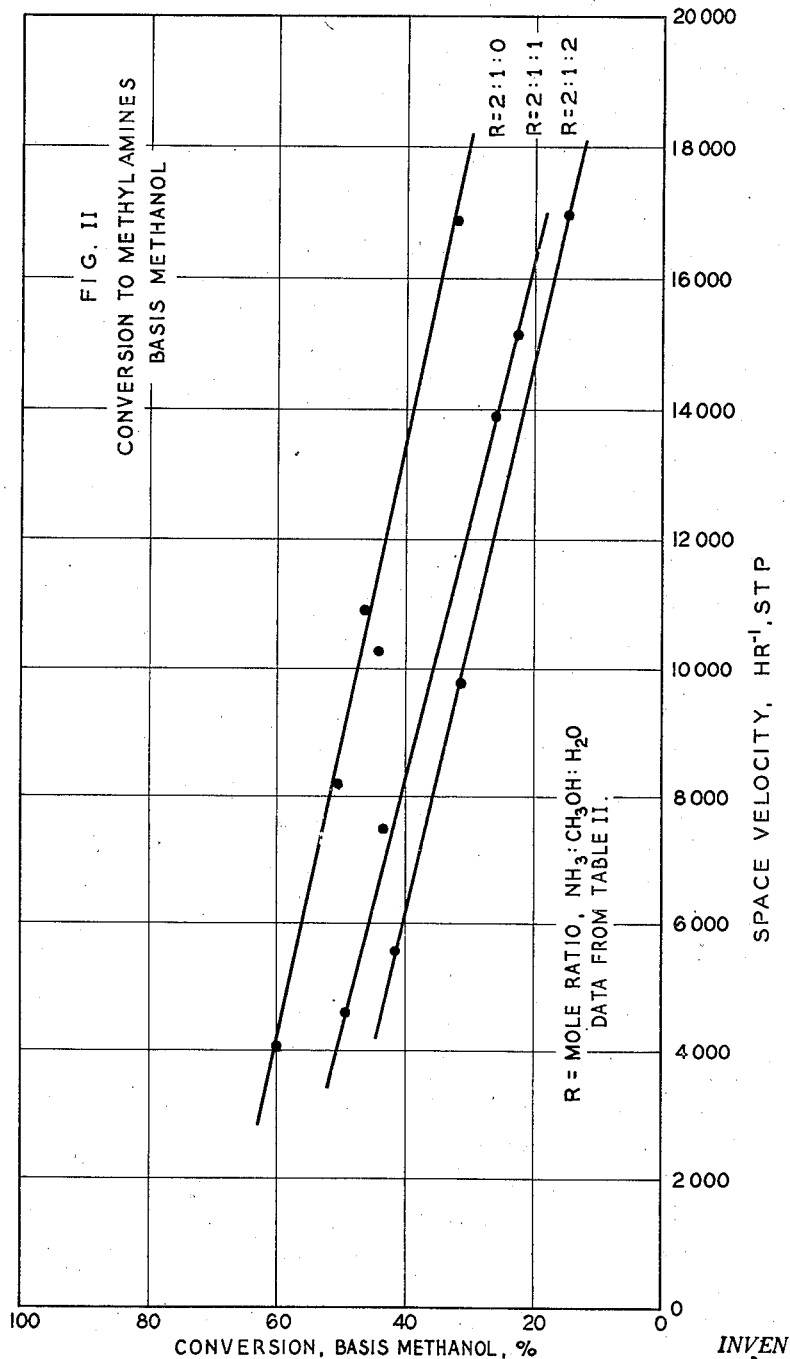

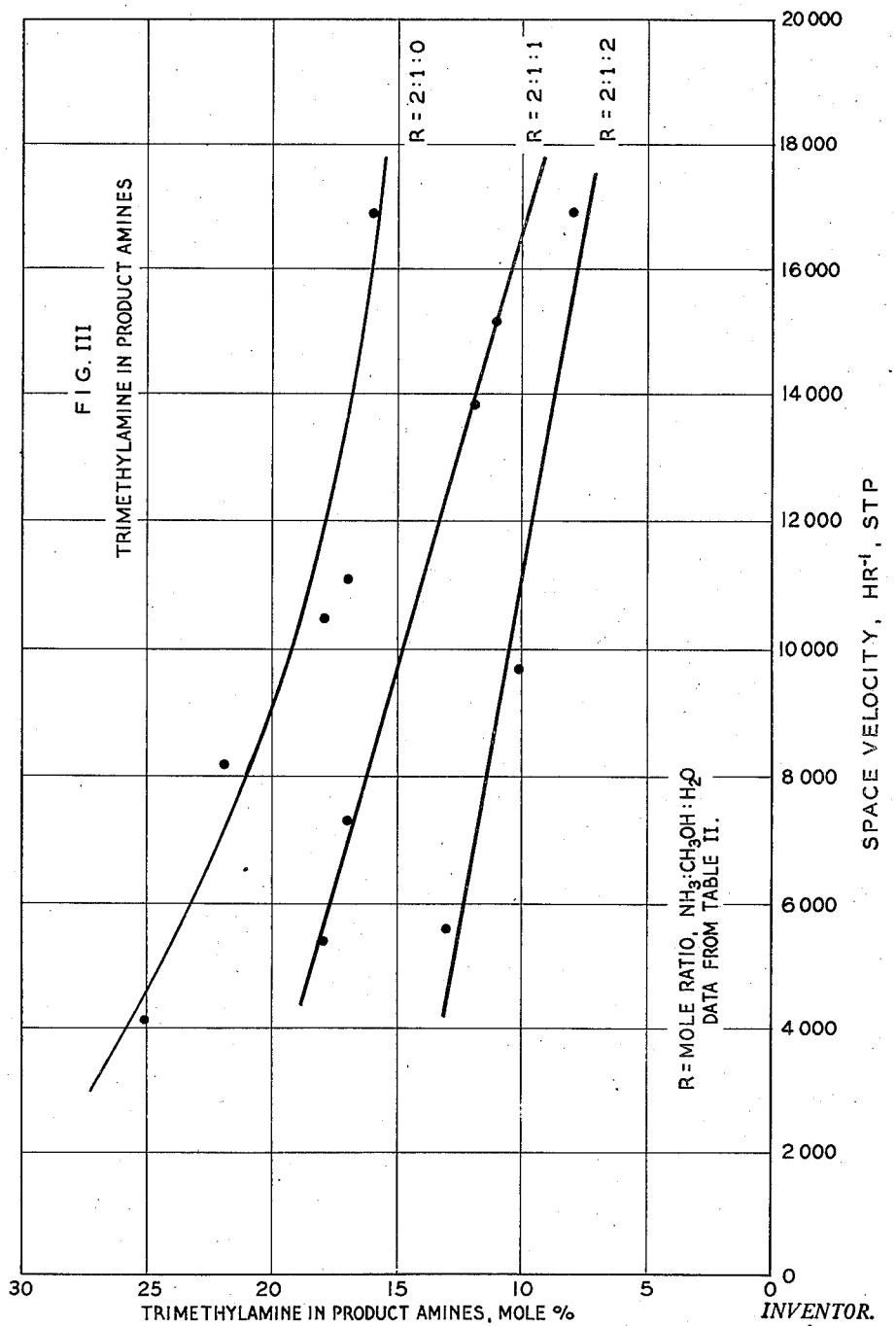

PROCESS FOR PREPARING METHYLAMINES

Everet Foy Smith, Terre Haute, Ind., assignor to Commercial Solvents Corporation, Terre Haute, Ind., a corporation of Maryland Application July 5, 1945, Serial No. 603,372

1 Claim. (Cl. 260—585)

This invention relates to a process for the catalytic synthesis of methylamines, and more particularly to a method for inhibiting the formation of trimethylamine therein.

The catalytic synthesis of methylamines has been carried out commercially by passing mixtures of substantially anhydrous methanol and ammonia in the vapor phase over an amination catalyst. The resulting product comprised a mixture of mono-, di-, and trimethylamine.

For economic reasons, it is sometimes desirable to produce the primary and secondary amines in preponderant proportions, to the partial or complete exclusion of the tertiary amine.

I have now found that the formation of the tertiary amine can be substantially reduced according to my invention, in which a quantity of water or steam is incorporated with a mixture of methanol and ammonia prior to the initiation of the amination reaction.

The mutual dehydration of methanol and ammonia to form methylamines is believed to proceed by a stepwise mechanism. Water is believed to be eliminated first between methanol and ammonia to form monomethylamine; then between monomethylamine and methanol to form dimethylamine; and finally between dimethylamine and methanol to form trimethylamine. From thermodynamical considerations, the addition of water to the feed mixture should tend to repress all of the reactions, and (depending on the relative rates of reaction and the relative equilibria), it might produce a substantial alteration in the product composition.

I have now found, unexpectedly, that the addition of water to the feed mixture of methanol and ammonia acts primarily relatively selectively to repress the formation of the tertiary amine, and to interfere comparatively little with the formation of the primary and secondary amines.

In carrying out my process I first introduce methanol, ammonia, and water in the desired proportions into a jacketed pressure vessel. The materials are thoroughly mixed and are then fed at the desired pressure to the processing equipment by pumping, or by application of heat to the feed-tank jacket. The mixture is then preheated, vaporized, superheated, and led over an amination catalyst at the desired temperature and space velocity; and after reaction, the products are collected in accordance with known procedures, as by cooling and condensing, or by absorption in acid.

The proportion of water utilized may vary over a wide range, and I find that the proportion of trimethylamine in the product decreases with increasing quantities of water. However, excessive quantities of water reduce the total conversion to amines appreciably, so that I prefer to utilize a mole ratio of ammonia:alcohol:water of between about 2:1:1 to 2:1:2.

In the drawings, Fig. I shows the variations with respect to space velocity in the total conversion of ammonia to methylamines at the indicated concentrations of water in the feed mixture. Fig. II illustrates the total conversion of methanol to methylamines, under the same conditions, and Fig. III illustrates the proportion of trimethylamine in the product amines likewise under the conditions indicated.

The data in Table I below, interpolated from Figures I, II, and III, illustrate the inhibiting effect of various ratios of water in the feed mixture at three different space velocities on the proportion of tertiary amine produced in the amination of methanol.

Table I

| Space Velocity, hr.⁻¹, STP | Temp., °C | Pressure, lb/in.², gage | Ratio, $NH_3$:$MeOH$:$H_2O$ (molar) | Conversion On $NH_3$, Per Cent | Conversion On MeOH Per Cent | Trimethylamine in Product mole Per Cent |
|---|---|---|---|---|---|---|
| 6,000 | 450 | 200 | 2:1:0 | 16.3 | 56 | 23 |
|  |  |  | 2:1:1 | 15.3 | 48 | 18 |
|  |  |  | 2:1:2 | 13.8 | 41 | 12 |
| 10,000 | 450 | 200 | 2:1:0 | 14.2 | 48 | 19 |
|  |  |  | 2:1:1 | 12.2 | 37 | 15 |
|  |  |  | 2:1:2 | 11.0 | 31 | 10 |
| 15,000 | 450 | 200 | 2:1:0 | 11.4 | 36 | 16 |
|  |  |  | 2:1:1 | 8.4 | 23 | 11 |
|  |  |  | 2:1:2 | 7.5 | 19 | 8 |

The pressure utilized for the conversion is not critical. Pressures from about 10 lb. per square inch up to about 200 lb. per square inch, gage, have been found satisfactory. However, total conversions are somewhat higher at the higher superatmospheric pressures, other conditions being the same.

Space velocities, likewise, may vary widely, and satisfactory results have been obtained over a range from about 4,000/hr. to nearly 17,000/hr., the lower space velocities resulting in somewhat higher conversions to amines, other conditions being the same.

The temperature utilized may vary widely, between about 400° C. to 550° C., but best results are usually obtained in the preferred range of about 425° C. to 500° C.

The amination catalyst may be any suitable vapor-phase amination catalyst such as those commonly used in the preparation of methylamines by the reaction of ammonia and methanol in the vapor-phase, such as, for example, alumina, aluminum phosphate, and phosphoric acid supported on an inert carrier such as kieselguhr or the like. One of the most effective of these is $\gamma$-alumina.

My invention may be illustrated by the following specific examples:

Example I

Into a jacketed pressure vessel were charged successively 32 parts by weight of methanol and 34 parts of liquid ammonia, corresponding to an ammonia:methanol molar ratio of 2:1. After thorough blending, this feed mixture was heated by circulating hot water through the jacket until the pressure within the feed tank was 200 lb./in.$^2$, gage. A stream of liquid was then led from the bottom of the tank successively through a preheater, a vaporizer, and superheater, from which it emerged as a stream of vapor at 450° C. The hot vapors then entered the converter, which contained 0.001886 ft.$^3$ of space filled with a catalyst, heated to 450° C., consisting essentially of $\gamma$-alumina compressed into the form of $\frac{5}{32}$-inch pellets, and capable of bringing about a mutual dehydration of methanol and ammonia to form methylamines. From the converter, the gaseous products of reaction passed through a condenser-cooler, and the cooled products were absorbed in a series of two flasks, the first containing 800 ml. of 3N hydrochloric acid, and the second containing 450 ml. of 0.2N hydrochloric acid. At the end of a sampling period of 23.8 minutes, the contents of the two flasks were mixed, giving a total volume of 1345 ml., and on analysis, the sample was found to have the following composition:

| | Moles/liters |
|---|---|
| Ammonia | 1.588 |
| Monomethylamine | 0.1726 |
| Dimethylamine | 0.0754 |
| Trimethylamine | 0.084 |

From the above data, it was calculated in a known manner that the space velocity through the converter catalyst-zone was 4100/hr., STP (4100 volumes of gaseous reactants, corrected to 0° C. and 760 mm. absolute, per volume of catalyst, per hour); the total conversions to methylamines were 17.3% based on ammonia, and 60% based on methanol; and of the amines produced, 25 mole percent were trimethylamine.

Example II

A mixture of 32 parts by weight of methanol, 18 parts of water, and 34 parts of liquid ammonia, corresponding to an ammonia:methanol:water molar ratio of 2:1:1 was prepared and passed over an alumina catalyst as described in Example I. At the end of a sampling period of 26.3 minutes, a product sample measuring 1350 ml. had been collected, and on analysis was found to have the following composition:

| | Moles/liters |
|---|---|
| Ammonia | 1.752 |
| Monomethylamine | 0.1977 |
| Dimethylamine | 0.0713 |
| Trimethylamine | 0.059 |

From the above data, it was calculated that the space velocity was 5390/hr., STP; the total conversions to methylamines were 15.8% based on ammonia, and 50% based on methanol; and of the amines produced, 18 mole percent were trimethylamine.

Example III

A mixture of 32 parts by weight of methanol, 36 parts of water, and 34 parts of liquid ammonia, corresponding to an ammonia:methanol:water molar ratio of 2:1:2, was prepared and passed over an alumina catalyst as described in Example I. At the end of a sampling period of 30.7 minutes, a product sample measuring 1435 ml. had been collected, and on analysis was found to have the following composition:

| | Moles/liters |
|---|---|
| Ammonia | 1.616 |
| Monomethylamine | 0.1761 |
| Dimethylamine | 0.0539 |
| Trimethylamine | 0.034 |

From the above data, it was calculated that the space velocity was 5540/hr., STP; the total conversions to methylamines were 14.0% based on ammonia, and 41% based on methanol; and of the amines produced, 13 mole percent were trimethylamine.

The results of these examples, together with the results from nine other experiments which were carried out in a similar manner, are presented in Table II, further to illustrate my invention; and the tabulated data have also been plotted in three charts, Figures I, II, and III, respectively, previously referred to.

Table II

| Ratio, NH$_3$:MeOH:H$_2$O (molar) | Temp., °C | Pressure, lb./in.$^2$, gage | Space Velocity hr.$^{-1}$, STP | Conversion | | Trimethylamine in Product, mole Per cent |
|---|---|---|---|---|---|---|
| | | | | On NH$_3$ Per cent | On MeOH Per cent | |
| 2:1:0 | 450 | 200 | 4,100 | 17.3 | 60 | 25 |
| | | | 8,200 | 15.1 | 50 | 22 |
| | | | 10,500 | 13.9 | 44 | 18 |
| | | | 11,100 | 14.4 | 46 | 17 |
| | | | 16,900 | 10.4 | 32 | 16 |
| 2:1:1 | 450 | 200 | 5,390 | 15.8 | 50 | 18 |
| | | | 7,300 | 13.9 | 43 | 17 |
| | | | 13,900 | 9.1 | 26 | 12 |
| | | | 15,200 | 8.3 | 23 | 11 |
| 2:1:2 | 450 | 200 | 5,540 | 14.0 | 41 | 13 |
| | | | 9,790 | 11.3 | 32 | 10 |
| | | | 16,900 | 5.9 | 15 | 8 |

While the above describes the preferred embodiments of my invention, it will be understood that departures may be made therefrom within the scope of the specification and claim.

I claim:

In the catalytic synthesis of methyl amines, the process which comprises mixing methanol and ammonia in the molecular proportions of about 1 to 2, vaporizing the mixture, passing the vaporized mixture over an alumina catalyst at a temperature within the range of about 425° C. to about 500° C. and under high atmospheric pressures and relatively repressing the formation of trimethyl amine in said process by adding to the reaction mixture, prior to passage over said catalyst, water in amount ranging from about 1 to 2 moles per mole of methanol.

EVERET FOY SMITH.

REFERENCES CITED

The following references are of record in the file of this patent:

UNITED STATES PATENTS

| Number | Name | Date |
|---|---|---|
| 2,082,105 | Herold | June 1, 1937 |
| 2,092,431 | Swallen et al. | Sept. 7, 1937 |

FOREIGN PATENTS

| Number | Country | Date |
|---|---|---|
| 477,938 | Great Britain | Jan. 10, 1938 |

OTHER REFERENCES

Darrell, "J. Chem. Soc.," vol. 127, pages 2399–2407.

Chemical Abstracts, vol. 31, (1937), page 4953.

Ehret, W. F., "Smith's College Chemistry" (D. Appleton Century Company, 6th ed., 1946) pages 232 and 236.

Parker, G. D. et al., "Mellor's Modern Inorganic Chemistry" (Longmans, Green & Company, 1946), pages 213–217.